(12) United States Patent
Abendroth et al.

(10) Patent No.: US 7,699,034 B2
(45) Date of Patent: Apr. 20, 2010

(54) METHOD FOR CONTROLLING AN AUTOMATIC SHUT-OFF PROCESS OF AN INTERNAL COMBUSTION ENGINE

(75) Inventors: Dirk Abendroth, Munich (DE); Werner Weigl, Ismaning (DE); Peter Straehle, Poing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/543,882

(22) Filed: Aug. 19, 2009

(65) Prior Publication Data

US 2009/0301420 A1    Dec. 10, 2009

Related U.S. Application Data

(63) Continuation of application No. PCT/EP2008/001408, filed on Feb. 22, 2008.

(30) Foreign Application Priority Data

Feb. 28, 2007    (DE)    ........................ 10 2007 009 871

(51) Int. Cl.
 *F02D 41/22*    (2006.01)
 *F02D 41/06*    (2006.01)
(52) U.S. Cl. ................. 123/179.4; 123/198 D
(58) Field of Classification Search ............. 123/179.4, 123/198 D; 74/7 R; 180/65.28
See application file for complete search history.

(56) References Cited

U.S. PATENT DOCUMENTS

| 3,926,075 | A  * | 12/1975 | Kronstadt ............... 123/179.24 |
| 4,520,271 | A  * | 5/1985  | Goertler et al. .......... 123/179.4 |
| 6,504,259 | B1 * | 1/2003  | Kuroda et al. ............ 180/65.28 |
| 6,526,931 | B1   | 3/2003  | Vilou |
| 6,895,744 | B2 * | 5/2005  | Osawa .......................... 60/274 |
| 6,939,265 | B2 * | 9/2005  | Rustige et al. ................ 477/84 |
| 7,091,629 | B2 * | 8/2006  | Hawkins ................... 123/179.4 |
| 2001/0038274 | A1 | 11/2001 | Peter |
| 2002/0074173 | A1 | 6/2002  | Morimoto et al. |
| 2004/0089258 | A1 | 5/2004  | Buglione et al. |
| 2006/0155435 | A1* | 7/2006 | Dell et al. ...................... 701/22 |

(Continued)

FOREIGN PATENT DOCUMENTS

DE    199 58 098 A1    6/2001

(Continued)

OTHER PUBLICATIONS

International Search Report dated Jul. 15, 2008 w/English translation (six (6) pages).

(Continued)

*Primary Examiner*—Stephen K Cronin
*Assistant Examiner*—Arnold Castro
(74) *Attorney, Agent, or Firm*—Crowell & Moring LLP

(57) ABSTRACT

A method is provided for controlling an automatic shut-off process of an internal combustion engine in a motor vehicle. An automatic shut-off process of the internal combustion engine is inhibited as a function of predetermined operating conditions. The automatic shut-off process of the internal combustion engine is inhibited, if the internal combustion engine was started by a tow start process within a current operating cycle or within a predetermined number of previous operating cycles.

11 Claims, 1 Drawing Sheet

U.S. PATENT DOCUMENTS

2007/0245997 A1 10/2007 Levasseur et al.
2007/0272187 A1 11/2007 Celisse et al.

FOREIGN PATENT DOCUMENTS

| DE | 100 30 290 A1 | 8/2001 |
| DE | 101 61 343 A1 | 7/2002 |
| EP | 1 036 694 A2 | 9/2000 |
| FR | 2 874 657 A1 | 3/2006 |
| FR | 2 874 660 A1 | 3/2006 |
| JP | 2004-211575 A | 7/2004 |

OTHER PUBLICATIONS

German Search Report dated Oct. 1, 2007 w/English translation of relevant portions (nine (9) pages).

* cited by examiner

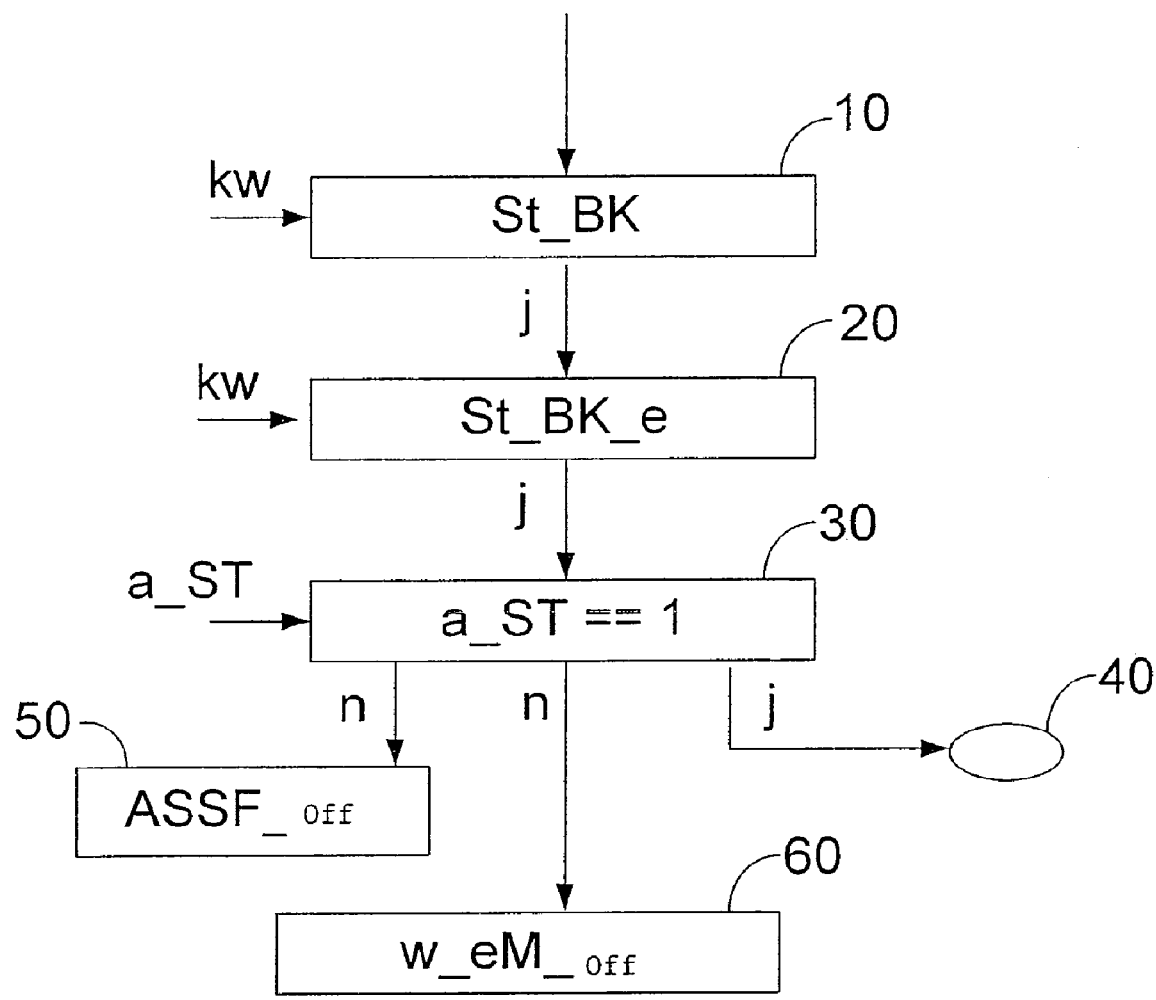
Fig.

METHOD FOR CONTROLLING AN AUTOMATIC SHUT-OFF PROCESS OF AN INTERNAL COMBUSTION ENGINE

CROSS-REFERENCE TO RELATED APPLICATIONS

This application is a continuation of PCT International Application No. PCT/EP2008/001408, filed Feb. 22, 2008, which claims priority under 35 U.S.C. §119 to German Patent Application No. DE 10 2007 009 871.7, filed Feb. 28, 2007, the entire disclosures of which are herein expressly incorporated by reference.

This application contains subject matter related to U.S. application Ser. No. 12/543,823, entitled "Method for Detecting a Tow Start Operation of an Internal Combustion Engine," filed on even date herewith.

BACKGROUND AND SUMMARY OF THE INVENTION

The invention relates to a method for controlling an automatic shut-off process of an internal combustion engine in a motor vehicle wherein an automatic shut-off process of the internal combustion engine is inhibited as a function of predetermined operating conditions.

In order to reduce fuel consumption and pollutant emissions, the current trend is to develop methods and systems (and to some extent they have been already installed) that automatically switch-off the internal combustion engine of a motor vehicle under certain conditions and/or in the presence of predetermined shut-off conditions and automatically restart the internal combustion engine in the presence of predetermined start-up conditions. Such methods and systems, in the nature of start/stop devices, are suited, above all, for urban traffic, in order to reduce the consumption of fuel since in urban traffic a vehicle often comes to a standstill at traffic lights or owing to the traffic and it is not necessary to run the internal combustion engine.

DE 101 61 343 A1 discloses an automatic stop and start-up control device for an internal combustion engine. In this case, the control device implements corresponding measures for shutting-off the internal combustion engine when all of the shut-off conditions are met. For example, the speed of the vehicle has to be below a predetermined limit value. In the case of manual transmissions no gear may be engaged, and in the case of automatic transmission vehicles the gear shift position of the transmission must be in a neutral position.

However, under certain circumstances it may occur that the driver does want the internal combustion engine to shut-off automatically and initiates all of the necessary actions required to this end, but owing to the absence of the system sided prerequisites an automatic shut-off is not possible. Thus, DE 100 30 290 A1 discloses a method and a system for automatically shutting-off and starting-up again an internal combustion engine. In this case, an automatic shut-off process is inhibited when the charge state of the battery of the vehicle is below a predetermined threshold.

Furthermore, an automatic shut-off process of the internal combustion engine ought to be inhibited in all cases, in which it can be assumed with high probability that a renewed start-up process cannot be easily initiated irrespective of whether it concerns an automatic or a conventional manual start-up process. If the internal combustion engine were to be shut-off and thereupon a renewed start-up process were not possible, the result would be customer complaints.

The object of the invention is to provide a method, which is intended for controlling an automatic shut-off process of an internal combustion engine and by which an automatic shut-off process of the internal combustion engine is inhibited, if it can be assumed with high probability that a renewed start-up process is not possible without more effort.

This object is achieved by a method for controlling an automatic shut-off process of an internal combustion engine in a motor vehicle, wherein an automatic shut-off process of the internal combustion engine is inhibited as a function of predetermined operation conditions. An automatic shut-off process of the internal combustion engine is inhibited, if the internal combustion engine was started by a tow start process within this operating cycle or within a predetermined number of previous operating cycles. Advantageous further developments are disclosed in the dependent claims.

The invention is based on the recognition that an internal combustion engine, which owing to a defect in the starter or another component of the start-up system or the (starter) battery state (for example, defective or empty battery) could not be started by means of the starter that is intrinsic in the vehicle electric system, but rather was started on the basis of a tow start process, should not be automatically shut-off, because presumably a renewed start-up process would be possible only by means of a tow start process. Therefore, the driver does not want the internal combustion engine to be automatically shut-off.

Accordingly, when an internal combustion engine is started on the basis of a tow start process, an automatic shut-off process of the internal combustion engine has to be blocked. The inventive method for controlling an automatic shut-off process of an internal combustion engine in a motor vehicle is characterized in that an automatic shut-off process of the internal combustion engine is inhibited, if the internal combustion engine was started by a tow start process within this operating cycle, thus, until the next manually conducted shut-off process of the internal combustion engine, or within a predetermined number of previous operating cycles.

It is advantageous to inhibit an automatic shut-off process of the internal combustion engine by deactivating a function, which carries out the automatic shut-off process of the internal combustion engine and which may be a part of a so-called "automatic start/stop system" or a "hybrid control unit." The deactivation offers the advantage that even on the grounds of a malfunction, for example, on the grounds of an erroneous signal evaluation, an automatic shut-off process of the internal combustion engine cannot be initiated for the duration of the deactivation. Moreover, a deactivation of the entire system leads to a decrease in the load on the system (utilization of the processor and the memory).

The tow start process of the internal combustion engine is detected advantageously by detecting and evaluating a signal, which represents the activity and/or inactivity of the starter unit. In one advantageous embodiment of the invention, a tow start process of an internal combustion engine is detected, when following detection of a successful start-up process of the internal combustion engine, the signal, representing the activity and/or inactivity of the starter unit, has not displayed any activity of the starter unit since the beginning of the start-up process. Therefore, the exclusive principle allows one to conclude in the absence of a starter actuation that external influences have caused the start-up process of the internal combustion engine, and, hence, an automatic shut-off of the internal combustion engine is inhibited.

A successful start-up of the internal combustion engine is detected advantageously when the initiation of a start-up process is detected, and when, for example, at the end of the start-up process a speed overrun of the crankshaft speed is detected. A (successful) start-up process of the internal combustion engine, thus, a transition from the immobile engine to the running engine, can be detected by evaluating a signal that represents the activity of the internal combustion engine, for example, by evaluating the crankshaft speed. Then, a successful start-up is detected at the end of the start-up process by a speed overrun that occurs and is detectable and/or by reaching the idle speed. Such a detection of a successful start-up can be rendered plausible in its temporal sequence of events by an evaluation within a time frame and can be improved by additional timing and debounce mechanisms.

If a start-up process is identified as a successful start-up, then the activity and/or inactivity of the starter unit of the internal combustion engine is checked by evaluating the signal, which represents the activity and/or inactivity of the starter unit of the internal combustion engine, advantageously for a predetermined time frame or speed that is predetermined for the internal combustion engine. The signal, representing the activity and/or inactivity of the starter unit, is configured advantageously in such a manner that when the activity of the starter is detected, the signal changes its status from "inactive" to "active." The signal can be reset from the "active" status to the "inactive" status after a predetermined time interval and successful evaluation or on reaching the end of the start-up process and successful evaluation. As the final condition for a successful tow start process, there must occur, in addition to the inactivity of the starter upon initiation of the start-up process, also the success of the tow start process through the detection of the termination of the start-up process—only then may the tow start process be evaluated as having occurred.

In addition to inhibiting an automatic shut-off process of the internal combustion engine, it is possible, on detection of a tow start process of the internal combustion engine, to initiate additionally a variety of measures with respect to the operating mode of the internal combustion engine or the whole vehicle. These measures lead to an improvement in the operating mode when vehicles with internal combustion engines are tow started.

If the motor vehicle is equipped, for example, with a hybrid drive unit, consisting of an internal combustion engine and an electric motor for driving the motor vehicle, it would be logical, for example, to inhibit the drive from changing from the internal combustion engine to the electric motor (that is, an automatic stop process of the internal combustion engine), if a tow start process of the internal combustion engine was detected, for example, owing to a defective start-up system. This measure would prevent the vehicle from coming to a standstill following a change-over of the drive from the internal combustion engine to the electric motor, because even then the start system cannot re-start the internal combustion engine owing to a defect in the start system. In that case, it would not be possible to re-start the internal combustion engine. Hence, there exists the risk of a "breakdown."

In summary, it must be pointed out that upon detecting a tow started internal combustion engine, in addition to deactivating a function that carries out the automatic shut-off process of the internal combustion engine, a variety of different measures can also be initiated in order to avoid a so-called "stranded vehicle." In this way, warranty costs and customer complaints can be avoided. Moreover, in the tow started case, individual components or subsystems can also be operated in a conservative "emergency mode" or the like in order to avoid a potential failure.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE depicts a simplified flow chart for the purpose of deactivating a function that carries out the automatic shut-off process of the internal combustion engine, as soon as a tow start process of the internal combustion engine has been detected.

DETAILED DESCRIPTION OF THE DRAWING

It is assumed that the motor vehicle, which is configured so as to be suitable for carrying out the flow chart, is equipped with a so-called "automatic engine start/stop system" for automatically stopping and starting-up again the internal combustion engine. In addition, the motor vehicle is equipped with a hybrid drive system, consisting of an internal combustion engine and an electric motor for driving the motor vehicle. In this case, the two drive units can be used alternatingly for the drive. The algorithm, shown in the flow chart, may be implemented in a motor control device, for example, in the engine control device that is intended for this purpose.

The flow chart for the method according to an embodiment of the invention starts at step 10, where it is determined by an evaluation of the crankshaft speed kw, whether the internal combustion engine has been or shall be started (beginning of the start-up process), therefore, the condition St_BK has been met. As soon as the crankshaft speed increases starting from zero (standstill), the beginning of an attempt to start-up the internal combustion engine St_BK is detected. Thereupon step 20 evaluates the crankshaft speed kw with respect to a speed overrun. As soon as a speed overrun is detected, a successful start-up of the internal combustion engine St_BK_e is detected, and one proceeds to step 30.

In the next step 30, a signal a_ST, representing the activity of a starter unit of the internal combustion engine, is evaluated. This signal is 0, when the starter (or rather the starter unit) is inactive and has not been active yet since the start-up process of the internal combustion engine St_BK. The signal changes from 0 to 1, as soon as activity of the starter unit is or was determined. Step 30 checks whether the starter unit is or was active by checking whether a_ST=0. If the starter unit (a_ST==1) is or was active, then the flow chart is terminated at step 40, and a_ST=0 is set.

If the starter unit was inactive, thus a_ST==1 does not hold, then in step 50 the function for automatically stopping and re-starting the drive unit is deactivated by generating a deactivation signal ASSF_off, and, in parallel, in step 60 a potential (future) change-over from running the internal combustion engine to running the electric motor in order to drive the vehicle is inhibited by generating a change-over inhibiting signal w_eM_off. This strategy prevents the internal combustion engine from being automatically shut-off and then no longer being startable, when a drive by means of the internal combustion engine is necessary or at least it appears to be logical.

As an alternative to this embodiment, it is possible, in addition or as an alternative, to deactivate or influence many other functions, so that they can cope with the operating principle of a tow started internal combustion engine.

Besides the input variable kw in steps 10 and 20, a plurality of other input parameters can be added in order to detect the start-up situation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an automatic shut-off process of an internal combustion engine in a motor vehicle, in which the automatic shut-off process is inhibited as a function of predetermined operating conditions, the method comprising the acts of:

evaluating whether a tow start process was used to start the internal combustion engine within at least one of a current operating cycle of the internal combustion engine and a predetermined number of previous operating cycles of the internal combustion engine; and inhibiting the automatic shut-off process of the internal combustion engine if the evaluation indicates that the engine was started by the tow start process.

2. The method according to claim 1, wherein the inhibiting act is carried out by deactivating a function that performs the automatic shut-off process of the internal combustion engine.

3. The method according to claim 1, wherein the evaluating act further comprises the act of evaluating a signal representing at least one of activity and inactivity of a starter unit of the internal combustion engine in the motor vehicle.

4. The method according to claim 2, wherein the evaluating act further comprises the act of evaluating a signal representing at least one of activity and inactivity of a starter unit of the internal combustion engine in the motor vehicle.

5. The method according to claim 1, wherein the evaluating act further comprises the act of detecting a signal representing at least one of activity and inactivity of a starter unit of the internal combustion engine, and concluding that the tow start process of the internal combustion occurred when, following detection of a successful start-up process of the internal combustion engine, the signal representing said at least one of activity and inactivity of the starter unit has not indicated any activity of the starter unit since the beginning of the start-up process.

6. The method according to claim 2, wherein the evaluating act further comprises the act of detecting a signal representing at least one of activity and inactivity of a starter unit of the internal combustion engine, and concluding that the tow start process of the internal combustion occurred when, following detection of a successful start-up process of the internal combustion engine, the signal representing said at least one of activity and inactivity of the starter unit has not indicated any activity of the starter unit since the beginning of the start-up process.

7. The method according to claim 5, wherein a successful start-up of the internal combustion engine is detected, when the start-up process is detected and, at the end of the start-up process, at least one of (i) a speed overrun is detected and (ii) a reaching of a predetermined idling speed is detected.

8. The method according to claim 6, wherein a successful start-up of the internal combustion engine is detected, when the start-up process is detected and, at the end of the start-up process, at least one of (i) a speed overrun is detected and (ii) a reaching of a predetermined idling speed is detected.

9. The method according to claim 5, wherein the start-up process is detected by evaluating a signal representing activity of the internal combustion engine.

10. The method according to claim 7, wherein the start-up process is detected by evaluating a signal representing activity of the internal combustion engine.

11. The method according to claim 1, further comprising the act of initiating additional measures with respect to the motor vehicle upon detecting the tow start process of the internal combustion engine.

* * * * *